Nov. 22, 1949     F. L. HARRISON     2,489,129
FROZEN CONFECTION AND EDIBLE CONTAINER THEREFOR
Filed Feb. 11, 1947
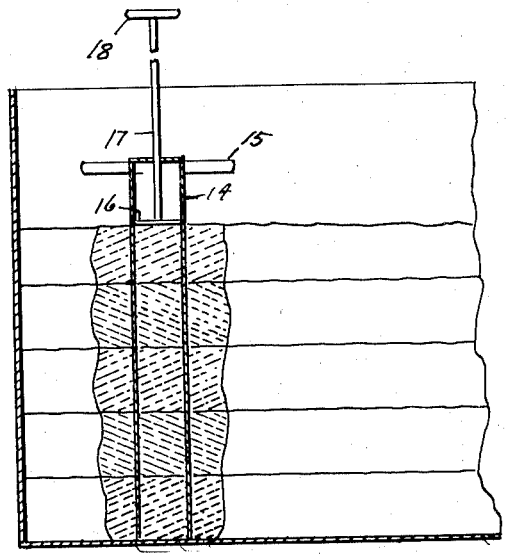
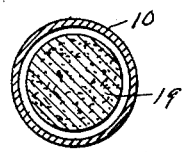
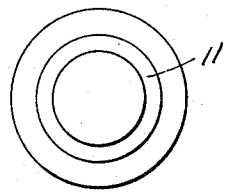
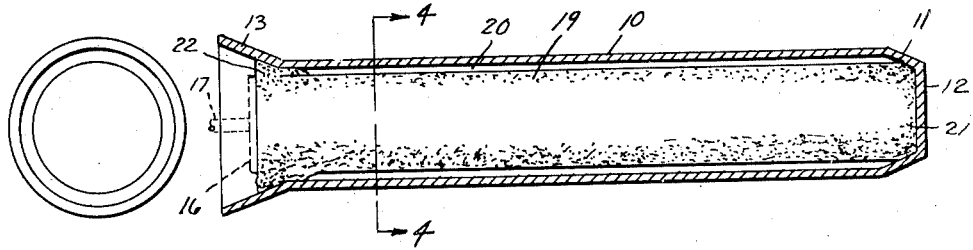
INVENTOR
F. L. HARRISON
BY E. B. Birkenbeuel
ATTORNEY Patented Nov. 22, 1949

2,489,129

UNITED STATES PATENT OFFICE 2,489,129

FROZEN CONFECTION AND EDIBLE CONTAINER THEREFOR

Francis L. Harrison, Seattle, Wash.

Application February 11, 1947, Serial No. 727,825

1 Claim. (Cl. 99—137)

This invention relates generally to foods and particularly to an article of manufacture in the form of an edible baked shell for holding ice cream with a filling therefor.

The main object is to provide a container or holder for a single serving of ice cream which will overcome many of the undesirable features of the well-known ice cream cone.

The second object is to construct a shell for the purpose stated which will make is possible to serve cream at a lower temperature than is possible with conical shells.

The third object is to provide a type of shell which can be filled throughout its length.

The fourth object is to provide a shell from which the cream cannot be easily lost and in which all of the cream is confined within the limits of the shell in order to prevent dripping.

The fifth object is to expedite the filling of the shell by making the filling of the server a one-stroke operation.

The sixth object is to make possible the serving of stratified cream within a single serving.

The seventh object is to facilitate the packaging of the filled shells for delivery to a customer or for carrying between a filling point and the point of consumption.

The eighth object is to reduce the amount of breakage ordinarily occurring with shells of this type.

The nine object is to so relate the shell to its contents that the ice cream is held axially with relation thereto and spaced therefrom, thereby providing an insulating space around the ice cream which will retard the melting thereof.

I accomplish these and other objects in the manner set forth in the following specification as illustrated in the accompanying drawing, in which:

Fig. 1 is a longitudinal section through the shell and its ice cream contents.

Fig. 2 is an end elevation of Fig. 1 at its open end.

Fig. 3 is an end elevation of Fig. 1 at its closed end.

Fig. 4 is a section taken along the line 4—4 in Fig. 1.

Fig. 5 is a fragmentary section through a Buck ice cream container showing stratified cream being used to fill my special form of shell.

Similar numbers of reference refer to the same or similar parts throughout the several views.

Referring in detail to the drawing, there is shown a cylindrical shell 10 of edible pastry having the slightly tapering section 11 which terminates in the closed end 12.

Opposite the section 11 is an outwardly tapering bell end 13. In practice the cylinder 10 could be 1⅜" diameter inside and about 5" long while the bell would be about ⅜" long. Obviously, any other desired dimensions could be used. The dimensions given are merely to illustrate the relationship of the elements involved.

The scoop or mold for forming the cylindrical plug of ice cream is a simple cylinder 14 having the two finger pins 15 while within the cylinder 14 is the piston 16 whose rod 17 is provided with a push button 18. This type of device is in use in various acts. It will be noted that the ice cream plug 19 is somewhat smaller than is the interior of the member 10, leaving an insulating air space 20.

It will be seen also that the end 21 of the plug 19 is within the tapering portion 11, whereas the end 22 has become somewhat enlarged due to the pressure of the piston 16 thereby sealing the end of the cylinder 10.

From the foregoing it will be seen that I have at once provided a convenient form of ice cream holding shell which accomplishes all of the objects above set forth.

I claim:

An article of manufacture consisting of a cylindrical pastry shell having one end closed and the opposite end open and bell shaped in combination with an ice cream plug of cylindrical cross section, having one end supported in the closed end of said container and having its other end supported in the bell end thereof whereby said plug will be held concentric with relation to said shell and spaced therefrom along its intermediate portion.

FRANCIS L. HARRISON.

REFERENCES CITED

The following references are of record in the file of this patent:

UNITED STATES PATENTS

| Number | Name | Date |
|---|---|---|
| 1,693,261 | Sweetland | Nov. 27, 1928 |
| 1,893,842 | Nehf | Jan. 10, 1933 |